Nov. 20, 1928.　　　　　　　　　　　　　　　　　　　1,692,736
G. W. HEINTZ
RABBIT CARRYING TRUCK FOR GREYHOUND RACING
Filed Oct. 20, 1926　　　2 Sheets-Sheet 1

INVENTOR
G. W. Heintz
BY
ATTORNEY

Nov. 20, 1928.
G. W. HEINTZ
1,692,736
RABBIT CARRYING TRUCK FOR GREYHOUND RACING
Filed Oct. 20, 1926
2 Sheets-Sheet 2
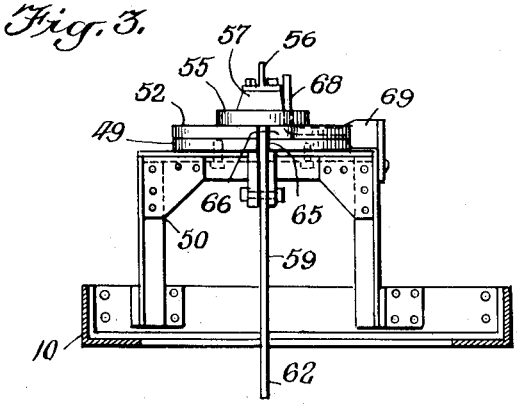
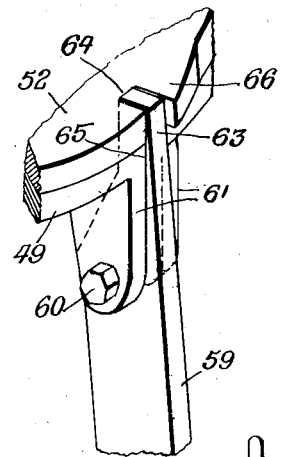
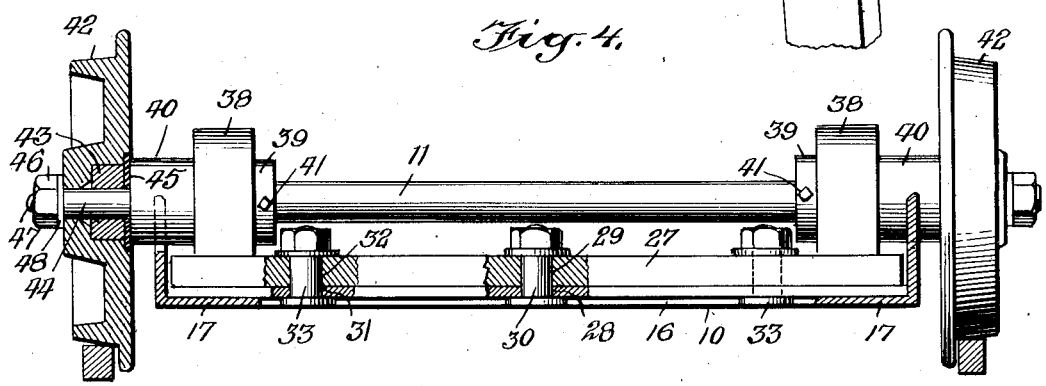
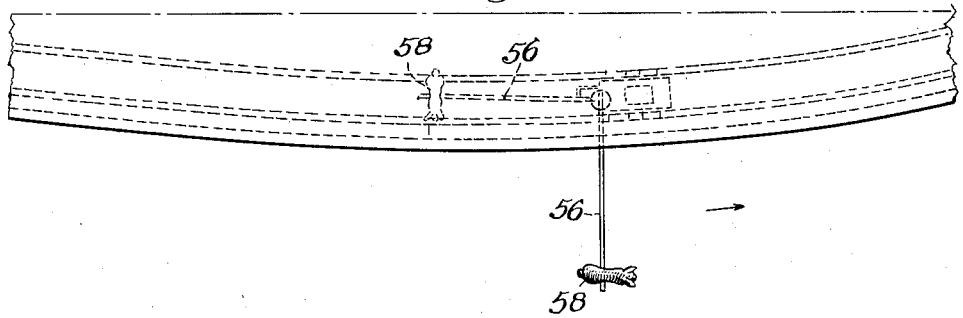
WITNESSES
INVENTOR
G. W. Heintz
BY
ATTORNEY Patented Nov. 20, 1928.

1,692,736

UNITED STATES PATENT OFFICE.

GEORGE WILLIAM HEINTZ, OF NEW ORLEANS, LOUISIANA.

RABBIT-CARRYING TRUCK FOR GREYHOUND RACING.

Application filed October 20, 1926. Serial No. 142,916.

This invention relates to trucks which travel along a track forming a part of a race course and carry a lure such as an imitation rabbit as an attraction to dogs which participate against each other in the race.

The principal object of the present invention is the provision of a truck of the indicated character, which will be more practical and efficient; which will have a better balance so that it will hold the track on which it travels whether moving straight away or along a curve.

Another object of the invention is the provision on a truck, of means for supporting a lure such as an imitation rabbit, which will be more reliable in operation in its movement from a luring position to a non-luring position.

With the foregoing, and other objects in view, the invention resides in the particular provision, construction, and relative disposition of the parts hereinafter fully described.

The nature of the invention and its distinguishing features and advantages will appear when the following description is read in conjunction with the accompanying drawings, in which:

Figure 3 is a transverse sectional view taken on the line 3—3 of Figure 1.

Figure 4 is a transverse sectional view taken on the line 4—4 of Figure 1.

Figure 5 is a fragmentary perspective view of a portion of the turn table and locking member which operates in conjunction therewith.

Figure 6 is a diagrammatic view of a portion of a track and the truck of the present invention shown traveling thereon, with the lure carrying arm in luring position in full lines, and in non-luring position in dotted lines.

Figure 1:
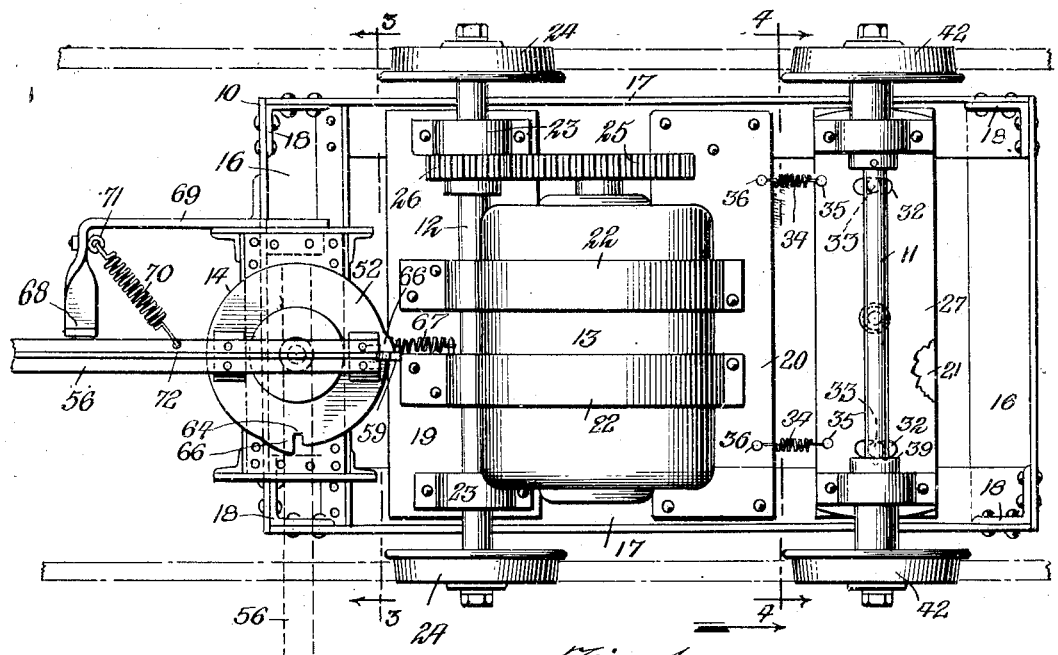
Figure 1 is a plan view of the truck embodying the present invention, the lure carrying arm being broken off and shown in the non-luring position.
Figure 2:
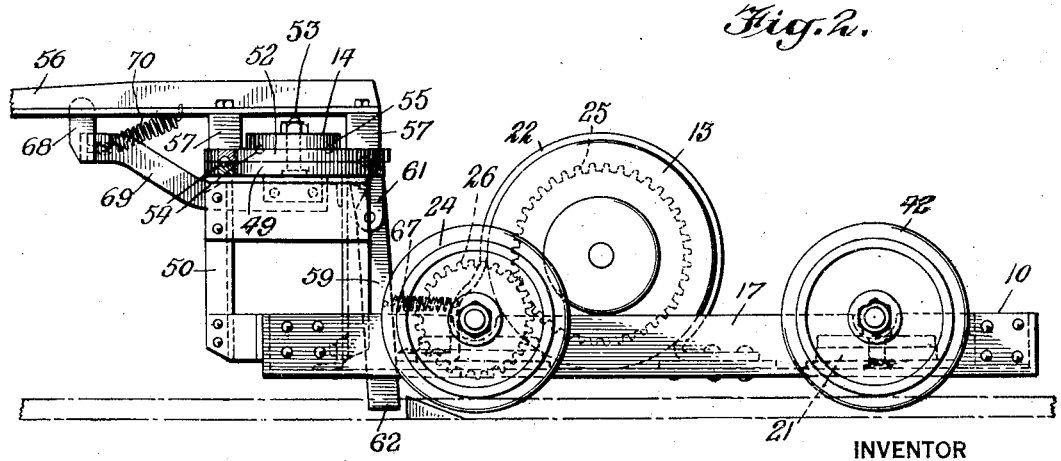
Figure 2 is a side elevation of the truck.

In accordance with the present invention, the truck is constructed of a rectangular frame 10 which is under slung on a front axle 11 and a rear axle 12, and which carries the driving means such as the electric motor 13. The motor 13 is located substantially centrally of the frame 10. The frame 10 also supports a turn table 14 on which is mounted the lure carrying arm. The turn table 14 is arranged at the rear end of the frame 10.

The frame 10 is constructed of end members 16 in the form of angle irons, and side members 17 in the form of angle irons. The members 16 and 17 are connected together by substantially right angular pieces 18 which are riveted or are otherwise secured respectively to the adjacent ends of the members 16 and 17 when disposed in rectangular formation. Arranged near the rear end of the frame 10 and having the opposite ends thereof riveted or otherwise secured to the horizontal flanges of the side members 16 is a plate 19. A plate 20 is also employed and is secured to the flanges of the side members 16 by rivets or other suitable fastening elements. The plate 20 is arranged substantially centrally of the frame 10. Arranged near the front end of the frame 10 is a plate 21 whose opposite ends are riveted or otherwise secured to the flanges of the side members 16. The motor 13 may be of any preferred type, and is supported by the plates 19 and 20, and is held in place by virtue of the use of straps 22, each of which is arranged over the motor casing, and each of which has the ends thereof riveted or otherwise secured to the plates 19 and 20 respectively. Arranged on the plate 19 and bolted thereto, are bearings 23. The rear axle 12 is supported for rotation by the bearings 23. Keyed to each end of the axle 12 is a flanged traction wheel 24. The shaft of the motor 13 has keyed thereto a gear 25 which meshes with a pinion 26 keyed to the axle 12. It will now be understood that when the motor 13 is in operation, rotary motion will be transmitted to the axle 12 by virtue of the gear 25 and pinion 26.

In order that the truck will travel without leaving the track, whether traveling straight away or on a curve, the front axle 11 is supported in a manner and is under the influence of a means presently to be described. A plate 27 is provided. The plate 27 is arranged over the plate 21 and is adapted to move with respect thereto. The plate 21 has a hole 28, whereas, the plate 27 has a hole 29. The holes 28 and 29 receive a pivot bolt 30. The plate 27 is thus mounted for pivotal movement. The plate 21 also has holes 31, whereas the plate 27 has arcuate slots 32, there being one hole 21 at each side of the bolt 30, and one slot 32 similarly disposed so that one slot 32 will be in registration with one hole 31. A bolt 33 extends through each hole 31 and into the related slot 32. In this way the plate 27 is limited in its pivotal movement in opposite directions. Springs 34 are employed. One end of each spring 34 is connected to a stud 35 on the plate 20, and the opposite end is connected to a stud 36 on the plate 27. The springs serve as means constantly acting on the plate 27 which yieldingly holds it substantially at a right angle with respect to the longitudinal axis of the frame 10. The plate 27 has secured thereto bearings 38. The bearings 38 support the front axle 11. Collars 39 and 40 surround the axle 11 and are disposed in pairs adjacent the opposite sides of each bearing 38. A set screw 41 holds each collar 39 against longitudinal movement on the axle. In this way the axle 11 is held against movement end wise. Arranged on each end of the axle 11 is a flanged traction wheel 42. Each wheel 42 has arranged in a recess therein, a bearing 43 through which the reduced end 44 of the axle extends. A dust plate 45 surrounds the end 44 and is arranged between the bearing 43 and the collar 40. A nut 46 is threaded on the threaded stud 47 formed on the end 44, and a washer 48 is arranged between the nut 46 and the side face of the wheel 42. It will therefore be understood that each wheel 42 is mounted for rotation on the axle 11. Moreover it will also be obvious that the wheels 42 are mounted so as to travel along a curved section of a track as well as along a straight away section of the track.

The turn table 14 hereinbefore referred to is arranged at the rear end of the frame 10. The turn table 14 includes a disk 49 which is secured to a support 50 in any practical manner. The support 50 is secured to the rear end member of the frame 10. The turn table 14, also includes a disk 52 which is arranged over the disk 49, and turns on a bolt 53 extending axially through the disks 49 and 52. Each of the disks 49 and 52 has a circular groove, and these grooves form a race way for anti-friction balls 54. In order to add strength to the turn table construction, there is provided a comparatively small disk 55 through which the bolt 53 extends. Anti-friction balls are arranged in a race way formed by virtue of circular grooves in the opposing faces of the disks 52 and 55. An arm 56 is supported from blocks 57 secured to the disk 52. The outer end of the arm 56 has arranged thereon a lure 58 in the form and appearance of a rabbit. The arm 56 is adapted to be moved to a position in which the lure 58 will be disposed at one side of the truck, and also to a position in which the lure will be disposed at the rear of the truck as shown in Figure 6.

The arm 56 is releasably held in the luring and the non-luring positions by means which includes a member 59 pivotally mounted as at 60 between spaced lugs 61 depending from the disk 49, so that the member 59 will be disposed in advance of the turn table but in cooperative relation. The member 59 has a trip portion 62 at the lower end and a holding portion 63 at the upper end. The disk 52 has radial notches 64. The disk 49 has a notch 65. There is an abutment 66 at each notch 64 in the disk 52, and the said abutments are on the circumferential edge of the disk. The member 59 is under the influence of a spring 67, one end of which is connected to the member 59 below its point of pivotal connection, and the opposite end of the spring is connected to one of the straps 22. The spring 67 has a normal tendency to move the holding portion 63 toward the turn table disks and is operative to move the holding portion 63 into the notch 65 in the disk 49 and either of the notches 64 when brought into registration with the holding portion 63 to releasably hold the arm 56 in the desired position. The abutments 66 serve for insuring the registration of the notches 64 with the holding portion 63. The arm 56 is limited in its movement to a non-luring position by a stop 68 carried by an arm 69 extending out from the support 50. The arm 56 is automatically moved to the non-luring position by a spring 70 which has one end thereof connected to the arm 69 as at 71, and the opposite end thereof is connected to the arm 56 as at 72. The arm 56 is moved to the luring position by hand after the holding portion 63 has been disengaged. When the arm 56 is in the luring position, and as the truck travels forwardly, the trip portion 62 will engage a suitable obstacle, and as a consequence the holding portion 63 will be disengaged, and the spring 70 will come into play and move the arm 56 to the non-luring position. The action just explained will be followed by the holding portion 63 entering one of the notches 64, and this is brought about by the cooperation of the spring 67 and the abutment 66 at the particular notch. The arm 56 is thus releasably held in the non-luring position.

I claim:

1. On a truck, a turn table at the rear, a lure carrying arm carried by said turn table, said turn table having radial notches therein, a pivoted member in advance of said turn table, said pivoted member having a holding portion, said pivoted member positioned with respect to the turn table so that said holding portion will be movable into and out of each of said notches, means acting on said member and having a normal tendency to move said holding portion toward said turn table and operative to move said holding portion into a notch when brought into registration with said holding portion, means constantly acting on said arm for effecting the movement of the arm to a non-luring position when said member has been moved to disengage the holding portion, and means rigidly secured which is encountered by said arm limiting the movement of said arm by said last means.

2. On a truck, a turn table, a fixed support at the rear of the truck on which the turn table is mounted for turning movement, said turn table having radial notches therein, an abutment on the turntable at each notch, a member pivotally mounted on said fixed support in advance of the turn table, said member having a lower trip engaging portion and an upper holding portion, said member positioned with respect to the turn table so that the holding portion will be movable into the path of travel of said abutments, said holding portion adapted to be moved into and out of each of said notches when brought into registration therewith, the holding portion encountering each abutment in the turning movement of the turn table to insure registration of each notch with said holding portion.

GEORGE WILLIAM HEINTZ.